April 17, 1951 — W. L. COLTERJOHN, JR — 2,548,870
POINT PROJECTION ION MICROSCOPE
Filed Oct. 17, 1949
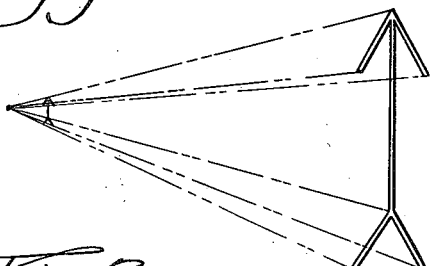
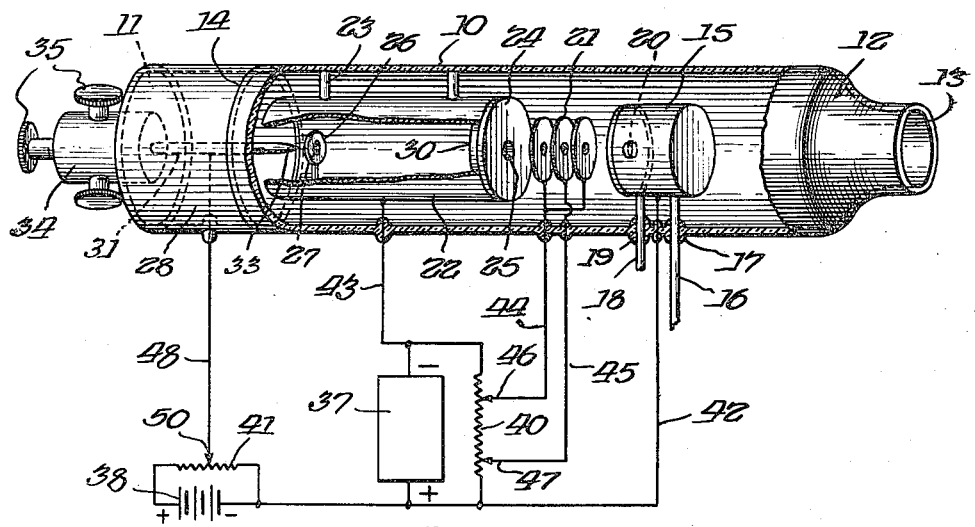
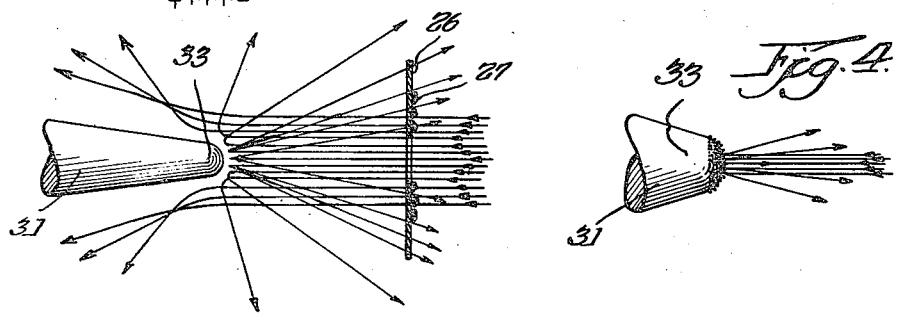
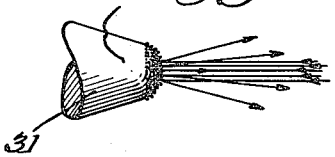
Inventor:
Walter L. Colterjohn, Jr.

Patented Apr. 17, 1951

2,548,870

UNITED STATES PATENT OFFICE 2,548,870

POINT PROJECTION ION MICROSCOPE

Walter L. Colterjohn, Jr., Oak Park, Ill.

Application October 17, 1949, Serial No. 121,787

11 Claims. (Cl. 250—49.5)

The invention relates to microscopes and has reference in particular to a point projection ion microscope capable of imaging the structure of matter with a high resolution.

An object of the invention is to provide a point projection microscope which will be simple in design and wherein its operation and quality of performance will not be impaired by those conditions which may be expected to exist even though only normal precautions are observed.

Another object of the invention resides in the provision of an ion microscope wherein an apparent point source of ions is obtained and which emits said ions in a diverging manner so that an object placed before the apparent source is correspondingly magnified.

Another object of the invention resides in the provision of an ion microscope of simple construction and which provides an apparent point source of ions by directing an ion beam of low angular divergence at the pointed end of a wire and along the axis of the same with the wire being electrically charged so as to reflect the ions incident on it and which accordingly appear to come from a point source.

Other objects of the invention reside in providing a wire for reflecting the ion beam as above described which will have a well founded point of small radius, in providing an object holder capable of supporting an object in front of and separated from the pointed end of the wire, and in providing an ion detection device such as a photographic film or fluorescent screen and mounted in a manner that a magnified image of the object will be projected onto the same.

Another object is to provide a point projection microscope wherein the wire providing the apparent source of ions can be maintained at a positive voltage.

Another object is to provide a point projection microscope of the type wherein a relatively high voltage can be applied to the wire, since the wire can be positive and thus the point is destroyed only when the field tears it apart, and is not destroyed by a bombardment of ions. Accordingly, it is possible to maintain the vacuum required in a demountable system and the higher voltage results in higher resolution and better transmission through the object.

With these and various other objects in view, the invention may consist of certain novel features of construction and operation as will be more fully described and particularly pointed out in the specification, drawings and claims appended hereto.

In the drawings which illustrate an embodiment of the invention, and wherein like reference characters are used to designate like parts—

Figure 1 is a schematic diagram illustrating the magnification of an object by rays projected from a point source;

Figure 2 is a perspective view, with parts broken away, to better illustrate the various elements comprising the present microscope;

Figure 3 is an enlarged fragmentary view showing the ion beams of low divergence and the rounded point from which the ion beams are reflected; and Figure 4 is an enlarged fragmentary view showing a modification of the invention wherein the object is mounted on the wire point.

Referring to the drawings, particularly Figure 2, the embodiment of the invention selected for illustration essentially consists of a glass housing or envelope 10 substantially cylindrical in shape, sealed at its forward end by the end member 11 and having its rear end reduced as at 12 to form the neck opening 13 which is suitably connected to a pump, not shown, whereby the desired vacuum is maintained within the glass envelope. All the elements comprising the point projection microscope are positioned within the envelope and it will be understood that access is had to said elements by means of the demountable joint located adjacent the forward end of the envelope, the joint being generally indicated by numeral 14. It will be understood that the joint may take any suitable form such as will permit the forward end of the envelope to be removed, thus removing the wire member fixed to the forward end and providing convenient access to the object holder which supports the object to be magnified. With the parts assembled as shown in Figure 2 the demountable joint 14 is such as to effectively seal the envelope, preventing the entrance of atmospheric air.

An ion source identified by numeral 15 is located within the envelope adjacent the rear end of the same, the source being suitably supported in desired position by means of the standard 16 which passes through the underside of the envelope and is sealed as at 17. The conduit 18 likewise passes through the underside of the envelope, being sealed at 19 and said conduit has connection with a suitable source of gas such as krypton or mercury which is supplied by the conduit to the element 15 for ionization. The ion source will not be described in detail since the present ion microscope is operative with any type of ion source, as, for example, the type described by Lamer, Samson & Compton in Physics Review, volume 48, 1935, or the type described by W. H. Zinn in Physics Review, volume 52, 1937. When the ion source is operative, an ion beam will be projected from the opening 20 of the element 15 and said beam will be controlled by the collimating lens indicated in its entirety by numeral 21 and diagrammatically illustrated as a plurality of metal discs having a central aperture on the longitudinal axis of the ion source. Said lens may be similar to the electrostatic projection lens illustrated in Electron Optics and the Electron Microscope by Zworykin. Although said lens is for use with electrons, the same will produce substantially similar results whether electrons or ions are used. In fact, it may be possible to eliminate the collimating lens, in which case the space charge effect that spreads the beam will result in reducing the source of the ions to a smaller area in the immediate vicinity of the axis, thus also reducing the random lateral velocity of those ions that reach the pointed end of the wire.

The numeral 22 indicates a cylindrical metal container or the like suitably supported by members 23 within the envelope 10, the container having an end member 24 closing its rear end and which is apertured as at 25 in longitudinal alignment with opening 20 in the ion source to permit passage of the ion beam. At its forward end the metal container 22 suitably supports an object holder 26 by means of which an object such as 27 is accurately mounted on the longitudinal axis coinciding with opening 20 in the ion source and thus in alignment with the ion beam.

The forward end 28 of the envelope 10 beyond the demountable joint 14 is removable from the envelope as a unit in order that convenient access may be had to the object holder for placing other objects to be magnified thereon and for renewing the photographic film 30 located on the inside of the metal container 22 and in contact with end member 24 of the same. The photographic film 30 may be replaced by a fluorescent screen when it is desired to view the magnified image rather than photograph the same. However, the film and the fluorescent screen are both provided with a central aperture coinciding with 25 in order that the ion beam may pass through to the pointed end of the wire to be now described.

In accordance with the invention the wire 31 supported by the removable forward end 28 provides a pointed end 33 in the path of the ion beam and which pointed end reflects the ions incident on it, as best illustrated in the enlarged fragmentary view of Figure 3. The pointed end 33 of the wire 31 is formed by tapering the end of the wire, with the taper terminating in a well rounded surface of small radius. The ion beam projected from the source 15 is preferably a beam of low divergence, as will be clear from Figure 3. In other words, the ion rays making up the beam are substantially parallel and the projection of the rays in a substantially parallel path is the function of the collimating lens. Whereas the ion rays incident on the point of the wire have low divergence, the ions reflected by the point have maximum divergence and these reflected ions appear to come from said point as their source. The wire 31 extends through the end 11 of the container and is suitably held by the member 34 having the adjusting screws 35 for adjusting the position of the pointed end of the wire so that it can be accurately aligned with the longitudinal axis of the ion source.

The object holder 26 is annular in shape with the object 27 being positioned substantially at the center of the annulus. For holding the object and to permit the passage of ions through the center opening, the object holder is preferably provided with a diaphragm or member 36 of any suitable transparent material. When it is desired to photograph the magnified image of the object 27, photographic film such as 30 is located on wall 24 of the metal container 22. Said photographic film may be replaced by a fluorescent screen for directly visualizing the magnified image. Figure 1 diagrammatically illustrates the magnification accomplished by the present microscope. The ions reflected from the pointed end 33 of the wire project the object 27 which in Figure 1 is illustrated as an arrow. Since the ions come from a point they have maximum divergence and the arrow is correspondingly magnified on the photographic film or fluorescent screen 30. In Figure 3 sufficient potential is applied to the rounded end 33 to eliminate or substantially reduce the scattering of the ions at the rounded end. One desirable advantage resulting from the opening in the diaphragm of the object holder is that it prevents the production of a secondary image on the ion detection device.

A modification of the invention is shown in Figure 4 wherein the pointed end 33 directly supports the object to be magnified. In this modification the ions approach very closely or may contact the object supported on said end of the wire and are reflected by the rounded contour of this end. The ion rays in thus approaching or contacting the object are subjected to scattering which results in a distribution of the reflected ions providing a pattern according to the nature of the object so that the ion detection device receives a projected image of the object.

In order to accomplish the reflection of the ions so that they appear to come from the pointed end of the wire as their source, it is necessary to maintain the various elements at certain operating voltages and which is accomplished by the device 37 constituting a source of high voltage direct current and by the direct current battery 38 which constitutes a source for a bias voltage. The device 37 should be capable of supplying a direct current voltage ranging from 200,000 volts to 5,000 volts, with 60,000 volts constituting the average for most specimens.

A resistor 40 is connected across the positive and negative terminals of the high voltage source 37 and a second resistor 41 is connected across the positive and negative terminals of the bias voltage source 38. The conductor 42 connects ion source 15 with the positive terminal of source 37, whereas, conductor 43 connects the negative terminal with the metal container 22. The apertured discs comprising the collimating lens 21 are connected by conductors 44, 45 and sliders 46, 47 with resistor 40, whereby a potentiometer is formed so that the voltages applied to the sections of the collimating lens may be adjusted as desired. The wire 32 is connected by conductor 48 and slider 50 with the resistor 41 forming therewith a potentiometer whereby the voltage on the wire may be maintained at the desired positive potential for repelling the ions incident on the pointed end of the wire.

In operation of the ion microscope of the invention it will be understood that the desired vacuum is maintained within glass envelope 10 by means of a vacuum pump, not shown, which is suitably connected to the reduced end 13. When the proper operating voltages are applied to the several parts of the device and gas is supplied to ion source 15 for ionization, an ion beam will be projected through opening 20 of said source. The gases that issue from opening 20 are immediately withdrawn from the envelope by said vacuum pump. The collimating lens 21 controls the angular divergence of the ion beam and also its intensity.

It is preferred that point 33 be maintained at a positive potential and accordingly there will be no emission of electrons from it. The ions having a positive charge are directed toward the point and are accordingly reflected by the same. During operation some of the gas molecules within the envelope will be ionized and the electrons liberated will bombard the pointed end due to its positive charge. Bombardment by electrons is not as destructive as bombardment by ions and as a result the present ion microscope does not require an excessively high vacuum. Another advantage inherent in the present microscope results from the fact that a high voltage can be applied to the wire. The use of higher voltages results in better resolution and better transmission through the objects to be magnified.

The primary advantage which the electron microscope has over the light microscope, namely, its higher resolving power, is based on the fact that electrons which possess some properties of wave motion have a shorter wave length than light, it being well known that light also possesses some properties of wave motion. The advantage which the present ion microscope has over the electron microscope in respect to its improved resolving power is based in a similar manner on the fact that ions have a shorter wave length than electrons. An additional aspect which makes possible the high resolution achieved by the present ion microscope is that the initial random lateral velocity of the ions can be controlled and set at almost any desired value by adjusting the collimating lens which controls the angular divergence of the ion beam. Obtaining a beam in which the ions incident on the pointed end of the wire have a low random lateral velocity is done at the expense of the intensity of the beam. When the microscope is used with a fluorescent screen, resolution and magnification must be sacrificed somewhat to get a sufficient beam intensity so that the magnified image can be seen. However, when film is used the beam intensity can be reduced with corresponding increase in resolution and magnification.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In an ion microscope, the combination including an ion source for projecting an ion beam, means positioned in the path of said beam and operative to reflect the ions incident on it, whereby said reflected ions appear to come from said means as their source, an object to be magnified located in the path of said reflected ions, and an ion detection device for receiving the magnified image.

2. In an ion microscope, the combination including an ion source for projecting an ion beam of low divergence, means positioned in the path of said beam and operative to reflect in a highly divergent manner the ions incident on it, whereby said reflected ions appear to come from said means as their source, an object to be magnified located in the path of said reflected ions, and an ion detection device for receiving the magnified image.

3. In an ion microscope, the combination including an ion source for projecting an ion beam of low divergence, means providing a tapered point terminating in an end of small radius, said rounded end being positioned in the path of said beam and operative to reflect the ions incident on it in a highly divergent manner, whereby said reflected ions appear to come from said rounded end as a point source, an object to be magnified located in the path of said reflected ions, and an ion detection device for receiving the magnified image.

4. In an ion microscope, the combination including an ion source for projecting an ion beam, a collimating lens in the path of said beam for controlling the intensity and the angular divergence of said beam, means positioned in the path of said controlled ion beam and operative to reflect the ions incident on it, whereby said reflected ions appear to come from said means as their source, an object to be magnified located in the path of said reflected ions, and an ion detection device for receiving the magnified image.

5. In an ion microscope, the combination including an ion source for projecting an ion beam, a collimating lens in the path of said beam for controlling the intensity and the angular divergence of said beam, means providing a tapered point terminating in an end of small radius, said rounded end being positioned in the path of said controlled beam and operative to reflect the ions incident on it in a highly divergent manner, whereby said reflected ions appear to come from said rounded end as a point source, an object to be magnified located in the path of said reflected ions, and an ion detection device for receiving the magnified image.

6. A point projection microscope comprising, in combination, a wire member providing a tapered point terminating in a rounded end of small radius, an object holder capable of supporting an object in front of and spaced from said rounded end, an ion detection device positioned with respect to the object holder so that ions reflected by said rounded end will pass through the object and project an image of the same onto said device, said ion detection device having an opening in axial alignment with said rounded end to permit the passage of an ion beam, an ion source located to the rear of the ion detection device and operative to project an ion beam through said opening and upon said rounded end of the wire member, an electric means for maintaining the various elements at the proper operating potentials.

7. A point projection microscope, in combination, an envelope sealed against the entrance of atmospheric air and connected to a pump for maintaining a vacuum within the envelope, a wire member within the envelope providing a pointed end on the longitudinal axis of the envelope, an object holder capable of supporting an object in front of and spaced from said pointed end, an ion detection device positioned with respect to the object holder so that ions reflected by said pointed end will pass through the object and project an image of the same onto said device, said ion detection device having an opening in axial alignment with the pointed end to permit the passage of an ion beam, an ion source located to the rear of the ion detective device and operative to project an ion beam through said opening and upon the pointed end of said wire member, a collimating lens located between the ion source and the ion detection device, and electric means for maintaining the various elements at the proper operating potentials.

8. In an ion microscope, the combination including an ion source for projecting an ion beam, means positioned in the path of said beam and operative to reflect the ions incident on it, whereby said reflected ions appear to come from said means as their source, an object positioned with respect to the reflected ions so as to be projected thereby as a magnified image, and an ion detection device for receiving a magnified image.

9. A point projection microscope including a member having a pointed end, an object mounted on said pointed end, means for directing an ion beam onto said pointed end, electric means for maintaining said member at a potential whereby said pointed end reflects the ions incident on it, and an ion detection device for receiving an image projected by said reflected ions.

10. A point projection microscope including a wire member having a pointed end, an object mounted on said pointed end, means for directing an ion beam of low divergence onto said pointed end, electric means maintaining said wire member at a positive potential whereby said pointed end reflects the ions incident on it and which are reflected in a highly divergent manner by the shape of said pointed end, and an ion detection device for receiving an image projected by said reflected ions.

11. A point projection microscope employing ions as the imaging radiation and based on the principle of projection without lenses for obtaining an enlarged image, including an ion source for projecting an ion beam, means of relatively small size located within the path of said ion beam and operative to reflect the ions incident upon it whereby said means functions as an apparent source of ions, an object to be imaged by the radiation from said apparent source of ions, and an ion detecting device for receiving said image.

WALTER L. COLTERJOHN, Jr.

REFERENCES CITED

The following references are of record in the file of this patent:

FOREIGN PATENTS

| Number | Country | Date |
|---|---|---|
| 554,710 | Great Britain | July 15, 1943 |

OTHER REFERENCES

Publication, Nucleonics, April 1949, pages 52 to 65, inclusive.